Patented May 12, 1931

1,804,640

UNITED STATES PATENT OFFICE

GEORGE H. OSGOOD, OF TACOMA, WASHINGTON

VEGETABLE PROTEIN-BASE GLUE

No Drawing. Application filed August 11, 1926. Serial No. 128,626.

The object of my invention is the production of a glue to be used in the manufacture of wooden articles and which is of great strength, highly water resistant and non-abrasive, which is cheap to make and may be put up in powdered form to be mixed with water when needed, or in which the several ingredients may be mixed with the water when the glue is being made preparatory to its use.

My composition consists of a mixture of a high protein content vegetable meal, such as peanut meal, hydrated lime, sodium carbonate, sodium silicate, and copper chloride or copper sulphate.

My improved glue may be prepared for use by either one of two methods, namely, all the ingredients may be mixed together and shipped or held in bulk, until needed for use, when the said mixture is stirred into water for a sufficient time to permit the water to thoroughly impregnate the mass; or the several ingredients may be separately mixed with the water to form the glue. In the first above method a powdered form of sodium silicate may be used instead of the liquid form thereof.

In either of the above cases the amount of water in which the mixing is performed may vary somewhat with the desired thickness of the glue needed, but it will be found that if the water weighs about two-and-a-half times the weight of the several ingredients, a glue of good average fluidity will result.

The proportions of the several ingredients are:—peanut meal, one hundred parts; sixteen parts of hydrated lime; ten parts of sodium carbonate; thirty parts of sodium silicate; and two parts of copper chloride or copper sulphate. The total quantity of water used is complete the glue would be about four hundred parts.

The preparation thus produced needs no warming or cooking to make it ready for use and it can be applied to the wood at any time within twenty-four hours after the mixture has been prepared.

The peanut, or other kind of meal, used in this glue is the ordinary commercial product and contains a small quantity of oil. The hydrated lime and the sodium carbonate are both effective in bringing the meal into solution. The sodium silicate is both a solvent for the meal and is also a filler. The copper chloride or the copper sulphate, whichever is used, both act as a water-proofing agent.

Having, therefore, described my invention, what I claim is:—

A fluid adhesive compound adapted to form a water-resistant, strong, non-abrasive glue comprising a mixture with one hundred parts of peanut meal, of about sixteen parts of hydrated lime, ten parts of sodium carbonate, thirty parts of sodium silicate, and two parts of copper sulphate, mixed with about four hundred parts of water.

GEORGE H. OSGOOD.